United States Patent [19]

Alling et al.

[11] Patent Number: 5,472,284
[45] Date of Patent: Dec. 5, 1995

[54] SHIELD FOR ROLLING ELEMENT BEARINGS

[75] Inventors: Richard L. Alling, Torrington; Daniel R. McLarty, Burlington, both of Conn.

[73] Assignee: The Torrington Company, Torrington, Conn.

[21] Appl. No.: 414,847

[22] Filed: Mar. 31, 1995

[51] Int. Cl.⁶ ..................................................... F16C 33/76
[52] U.S. Cl. .......................................... 384/484; 277/152
[58] Field of Search .................................. 384/484, 486, 384/477; 277/35, 152

[56] References Cited

U.S. PATENT DOCUMENTS

| | | | |
|---|---|---|---|
| 1,722,488 | 7/1929 | Bott et al. | 384/488 |
| 1,722,491 | 7/1929 | Bott et al. | 384/488 |
| 2,000,276 | 5/1935 | Delaval-Crow | 384/488 |
| 2,054,582 | 9/1936 | Delaval-Crow | 384/477 |
| 2,766,082 | 10/1956 | Ritchey | 384/484 |
| 2,915,345 | 12/1959 | Workman | 384/484 |
| 3,114,559 | 12/1963 | Miglietti et al. | 277/94 |
| 4,183,592 | 1/1980 | Sudo et al. | 384/488 |
| 4,325,591 | 4/1982 | Otto | 384/486 |
| 5,332,232 | 7/1994 | Kurose | 384/484 X |

*Primary Examiner*—Thomas R. Hannon
*Attorney, Agent, or Firm*—John C. Bigler

[57] ABSTRACT

A shield has an outer periphery portion engaging a grooved outer bearing ring, an inner periphery portion adjacent an inner bearing ring, and a mid portion joining the outer periphery portion and the inner periphery portion. The outer periphery portion has an annular reverse bend and terminates in an annular flat surface having radially outer and radially inner edge portions. The radially outer edge portion and the radially inner edge portion and the reverse bend each contact the grooved outer bearing ring to retain the shield axially and radially.

23 Claims, 1 Drawing Sheet

SHIELD FOR ROLLING ELEMENT BEARINGS

BACKGROUND OF THE INVENTION

This invention relates generally to rolling element bearings and, more particularly, to a bearing shield that is retained within the rolling element bearing by engagement with a grooved outer bearing ring.

A bearing shield may be provided in a rolling element bearing assembly to close a side of the bearing so as to retain lubricant, to exclude foreign matter, to provide a more uniform outer bearing configuration, and to otherwise guard the rolling elements. The bearing shield is usually formed of metal and may incorporate provision for a resilient seal engaging the inner bearing ring. Various bearing shield designs have been proposed, including some that have an outer lip that may be deformed into a groove of an outer bearing ring to retain the bearing shield in the rolling element bearing to form a bearing assembly.

Although such proposed bearing shields have achieved a simple axial installation with a degree of axial and radial retention, those designs have not always provided sufficient rotational retention. That is, the torque required to rotate the bearing shield with respect to the grooved outer bearing ring may be inadequate to prevent relative rotation. And, due to dimensional variations resulting from production tolerances, the torque required to rotate the bearing shield with respect to the grooved outer bearing ring is difficult to control with previous bearing shield designs.

The foregoing illustrates limitations known to exist in present rolling element bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a shield for use with a rolling element bearing having an axis, an inner bearing ring, a grooved outer bearing ring and rolling elements between the inner and outer bearing rings. The shield has an outer periphery portion engageable with the grooved outer bearing ring, an inner periphery portion to be adjacent the inner bearing ring, and a mid portion joining the outer periphery portion and the inner periphery portion. The outer periphery portion has an annular reverse bend and terminates in an annular flat surface having radially outer and radially inner edge portions. The outer periphery portion is configured such that, after installation in the rolling element bearing, the radially outer edge portion and the radially inner edge portion and the reverse bend each contact the grooved outer bearing ring to retain the shield axially and radially.

In another aspect of the present invention, this is accomplished by providing a rolling element bearing assembly including a shield.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
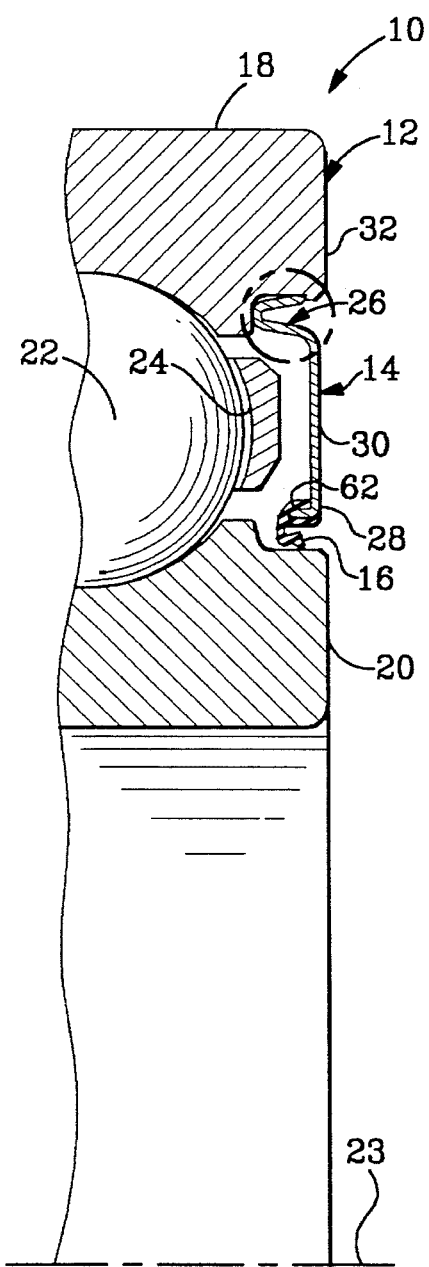
FIG. 1 is a cross-sectional view illustrating an embodiment of the shield and a portion of the rolling element bearing assembly of the present invention.

Referring now to the drawings, FIG. 1 illustrates a portion of rolling element bearing assembly 10 comprising rolling element bearing 12, shield 14, and optional resilient seal 16. Rolling element bearing 12 includes grooved outer bearing ring 18, inner bearing ring 20 and rolling elements 22, and has axis 23. In the embodiment shown, rolling elements 22 are balls and are retained in bearing cage 24; however, rollers of various shapes, with or without bearing cages or retainers may be used with the present invention.

Shield 14 comprises outer periphery portion 26 engageable with grooved outer bearing ring 18, inner periphery portion 28 located adjacent inner bearing ring 20, and mid portion 30 joining outer periphery portion 26 and inner periphery portion 28. Mid portion 30 may be substantially flat and directed radially in substantial alignment with outer bearing ring end surface 32, as illustrated in FIG. 1, or may have various other configurations to provide a lubricant reservoir, enhance structural rigidity, or fulfil other functions.

Figure 3:
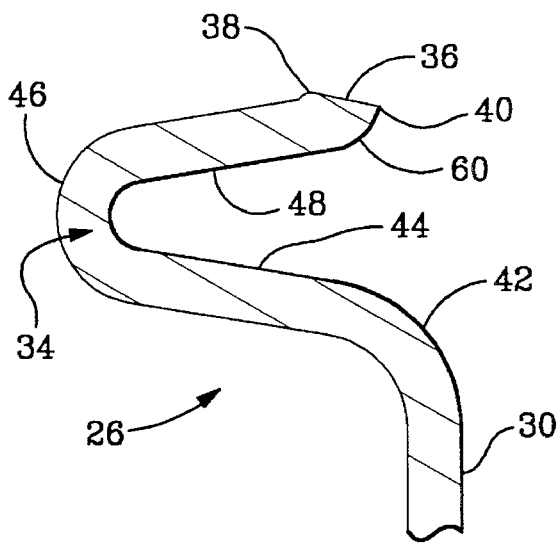
FIG. 3 is an enlarged cross-sectional view of the shield illustrated in FIGS. 1 and 2 prior to installation in a rolling element bearing to form the rolling element bearing assembly.
Figure 2:
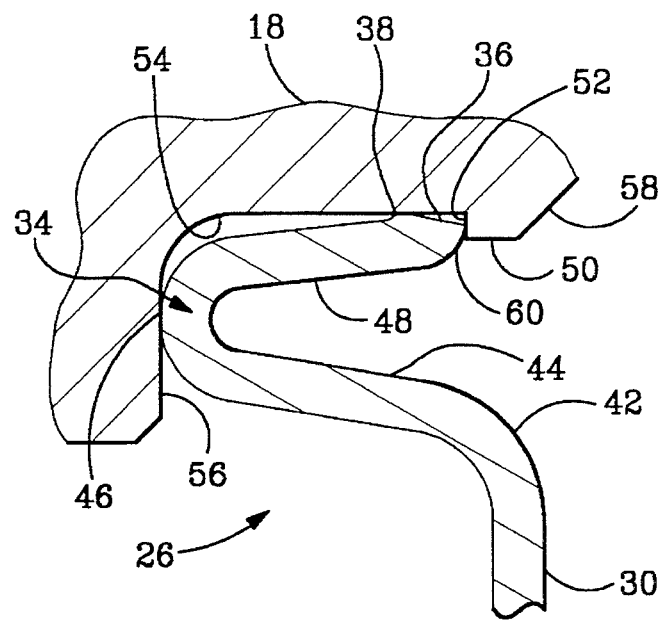
FIG. 2 is an enlarged cross-sectional view of a portion of the shield and rolling element bearing assembly of the present invention as indicated by the phantom line of FIG. 1.

As illustrated in FIGS. 2 and 3, outer periphery portion 26 has annular reverse bend 34 and terminates in annular flat surface 36 with radially outer edge portion 38 and radially inner edge portion 40. Outer periphery portion 26 is configured such that, after installation in rolling element bearing 12, radially outer edge portion 38 and radially inner edge portion 40 and reverse bend 34 each contact grooved outer bearing ring 18 to retain shield 14 axially and radially.

Reverse bend 34 comprises an annular corrugation or folding of outer periphery portion 26 first away from the radial orientation of mid portion 30 and, then, back upon itself. Specifically, axially inwardly directed first bend 42 adjacent mid portion 30 forms first conical surface 44, directed radially outwardly and axially inwardly. Axially outwardly directed second bend 46 folds outer periphery portion 26 back upon itself and forms second conical surface 48, directed radially outwardly and axially outwardly.

As shown in FIGS. 2 and 3, first and second bends 42 and 46 provide a V-shape in longitudinal section, the closed portion of the V-shape being directed axially inwardly and the open portion of the V-shape being directed axially and radially outwardly. The angle between first and second conical surfaces may be approximately 20 degrees, for example, before installation, although other angles may be used with similar effect. The V-shape facilitates axial installation of shield 14 by pressing the shield axially inwardly until the open portion of the V-shape engages a groove of grooved outer ring 18, as described below.

Preferably, at least a portion of shield 14 is made of a somewhat resilient material and is configured to provide an interference fit such that shield 14 may be biased into engagement with grooved outer bearing ring 18 to enhance retention. Applicants have found that shield 14 may be made of low carbon or moderate carbon steel without hardening, of low carbon steel carburized and case hardened, of moderate carbon steel with selective or all-over hardening, either with or without tempering, of 305 stainless steel, or of other similar materials. In addition, a molded polymer such as Aurum polyimide, for example, available from Matsui Toatsu Company, New York City, N.Y. is anticipated for use in certain applications.

Outer bearing ring 18 has outer lip 50 having a first inside diameter and a groove extending from outer lip 50 radially outwardly along first surface 52, extending from first surface 52 axially inwardly along second surface 54, extending from second surface 54 radially inwardly along third surface 56 to a second inside diameter smaller than the first inside diameter. Outer bearing ring 18 may include radiused or beveled surface 58 adjacent outer lip 50 for directing outer periphery portion 26 of shield 14 radially inwardly during installation.

Shield 14 may be installed by pressing the shield axially inwardly, as outer lip 50 elastically deflects and partially closes the V-shape of outer periphery portion 26 radially inwardly, until the closed portion of the V-shape contacts third surface 56. The open portion of the V-shape is biased radially outwardly into the groove of grooved outer ring 18 to provide a snap fit during installation. After installation, radially inner edge portion 40 contacts first surface 52 and radially outer edge portion 38 contacts second surface 54.

Flat surface 36 of outer periphery portion 26 is directed radially inwardly and axially outwardly from radially outward edge portion 38 to radially inward edge portion 40. Outer periphery portion 26 may include radially outwardly directed third bend 60 adjacent flat surface 36, facilitating forming of flat surface 36 by shearing. Third bend 60 also avoids a knife-edge shape of radially inward edge portion 40 that would be difficult to control, would reduce torque to rotate, and would hinder non-destructive removal of shield 14.

Inner periphery portion 28 of shield 14 may include axially inwardly directed lip 62, as shown in FIG. 1, to provide stiffening of shield 14. In addition, inner periphery portion 28 may provide axially inwardly directed lip 62 or other adaptation for mounting resilient seal 16, having a seal lip contacting inner bearing ring 20, or other means for sealing shield 14 with respect to inner bearing ring 20.

For applications requiring additional torque to rotate, outer periphery portion 26 and grooved outer bearing ring 18 may have conforming irregularities or other key means to preclude relative rotation between shield 14 and grooved outer bearing ring 18. Alternatively, outer periphery portion 26 may be fused to grooved outer bearing ring 18 at one or a plurality of locations by welding.

Various means may be employed to stiffen shield 14 to resist permanent set dishing or radial collapse of shield 14 inboard of the folded section during insertion into grooved outer bearing ring 18. Eyelets of various configurations or embossing or offsetting of mid portion 30 may be employed. Conventional progressive tooling combining a diameter reducing station and a pinch trim station may be used to produce shield 14, and a double action tool may be used to press shield 14 axially and to move outer periphery portion 26 radially to effect installation.

From the above description, it will be apparent that the present invention provides a "pop-in" shield or shield seal combination for rolling element bearings that has improved resistance to rotation without the need for a significant metal reforming operation in order to secure its attachment to the outer bearing ring at final assembly.

Having described the invention, what is claimed is:

1. A shield for a rolling element bearing having an axis, an inner bearing ring, a grooved outer bearing ring and rolling elements between the inner and outer bearing rings, the shield comprising:

an outer periphery portion engageable with the grooved outer bearing ring;

an inner periphery portion to be located adjacent the inner bearing ring; and a mid portion joining the outer periphery portion and the inner periphery portion;

the outer periphery portion having an annular reverse bend and terminating in an annular flat surface having radially outer and radially inner edge portions, the outer periphery portion being configured such that, after installation in the rolling element bearing, the radially outer edge portion and the radially inner edge portion and the reverse bend each contact the grooved outer bearing ring to retain the shield axially and radially.

2. The shield according to claim 1, wherein at least a portion of the shield is made of a resilient material and is configured to provide an interference fit with the grooved outer bearing ring such that the shield may be biased into engagement with the grooved outer bearing ring to enhance retention.

3. The shield according to claim 1, wherein the shield is made of a resilient metal.

4. The shield according to claim 1, wherein the shield is made of a resilient polymer.

5. The shield according to claim 1, wherein the reverse bend of the outer periphery portion comprises an inwardly directed first bend adjacent the mid portion of the shield and an outwardly directed second bend, the first bend and second bend providing a V-shape in longitudinal section, the closed portion of the V-shape being directed axially inwardly and the open portion of the V-shape being directed axially and radially outwardly, such that the shield may be installed by pressing the shield axially inwardly until the closed portion of the V-shape contacts a radially inwardly directed surface of the grooved outer ring.

6. The shield according to claim 1, wherein the reverse bend of the outer periphery portion comprises an inwardly directed first bend adjacent the mid portion of the shield and an outwardly directed second bend, the first and second bends providing a V-shape in longitudinal section, the closed portion of the V-shape being directed axially inwardly and the open portion of the V-shape being directed axially and radially outwardly, such that the shield may be installed by pressing the shield axially inwardly until the open portion of the V-shape engages a groove of the grooved outer ring.

7. The shield according to claim 6, wherein the outer periphery portion is made of a resilient material such that the open portion of the V-shape is biased radially outwardly into the groove of the grooved outer ring to provide a snap fit during installation.

8. The shield according to claim 6, wherein the outer periphery portion further comprises a radially outwardly directed third bend adjacent the flat surface.

9. The shield according to claim 8, wherein the flat surface of the outer periphery portion is directed radially inwardly and axially outwardly from the radially outward edge portion to the radially inward edge portion.

10. The shield according to claim 1, further comprising key means engageable with the grooved outer ring to prevent relative rotation between the shield and the grooved outer ring.

11. The shield according to claim 1, wherein the inner periphery portion includes an axially directed lip.

12. The shield according to claim 1, wherein the inner periphery portion is adapted for mounting seal means to provide sealing with respect to the inner bearing ring.

13. The shield according to claim 1, wherein the mid portion of the shield is substantially flat and is directed radially.

14. A rolling element bearing assembly having an axis and comprising:

an inner bearing ring;

a grooved outer bearing ring;

rolling elements between the inner and outer bearing rings; and a shield having an outer periphery portion contacting the grooved outer bearing ring, an inner periphery portion adjacent the inner bearing ring, and a mid portion joining the outer periphery portion and the inner periphery portion;

the outer periphery portion of the shield having an annular reverse bend and terminating in an annular flat surface having radially outer and radially inner edge portions, the radially outer edge portion and the radially inner edge portion and the reverse bend each contacting the grooved outer bearing ring to retain the shield axially and radially.

15. The rolling element bearing assembly according to claim 14, wherein the grooved outer bearing ring has an outer lip having a first inside diameter and has a groove extending from the outer lip radially outwardly along a first surface, the groove extending from said first surface axially inwardly along a second surface, the groove extending from said second surface radially inwardly along a third surface to a second inside diameter smaller than the first inside diameter.

16. The rolling element bearing assembly according to claim 15, wherein the radially inner edge portion of the shield contacts said first surface, the radially outer edge portion of the shield contacts said second surface, and the reverse bend of the shield contacts said third surface.

17. The rolling element bearing assembly according to claim 15, wherein the shield is made of a resilient material and wherein the outer periphery portion has an angled surface such that axial insertion of the shield is facilitated by the engagement of the angled surface by the outer lip of the grooved outer bearing ring to deflect the shield radially inward.

18. The rolling element bearing assembly according to claim 15, wherein the grooved outer bearing ring has an axially outward end surface and wherein the mid portion of the shield is substantially flat and is directed radially in substantial alignment with said outer bearing ring end surface.

19. The rolling element bearing assembly according to claim 14, wherein at least a portion of the shield is made of a resilient material and forms an interference fit with the grooved outer ring such that the radially outer edge portion of the shield is biased against a groove of the grooved outer bearing ring.

20. The rolling element bearing assembly according to claim 14, wherein the shield is made of a resilient material and forms an interference fit with the grooved outer ring such that the radially outer edge portion of the shield, the radially inner edge portion of the shield and the reverse bend of the shield are all biased against the grooved outer bearing ring.

21. The rolling element bearing assembly according to claim 14, further comprising key means between the shield and the grooved outer bearing ring for preventing relative rotation between the shield and the grooved outer bearing ring.

22. The rolling element bearing assembly according to claim 14, wherein the shield is fused to the grooved outer bearing ring at at least one location such that relative rotation between the shield and the grooved outer bearing ring is prevented.

23. The rolling element bearing assembly according to claim 14, further comprising seal means on the inner periphery portion of the shield for providing sealing with respect to the inner bearing ring.

* * * * *